United States Patent [19]

Holtsclaw et al.

[11] 3,828,919
[45] Aug. 13, 1974

[54] FEED CONVEYOR WITH SELECTIVE DISCHARGE

[76] Inventors: Robert G. Holtsclaw; Jerrell D. Holtsclaw, both of Switz City, Ind.

[22] Filed: Feb. 23, 1973

[21] Appl. No.: 335,361

Related U.S. Application Data

[63] Continuation-in-part of Ser. No. 207,201, Dec. 13, 1971, Pat. No. 3,750,861.

[52] U.S. Cl.................. 198/160, 198/66, 198/159, 198/205, 198/207, 198/204
[51] Int. Cl............................................ B65g 15/00
[58] Field of Search......... 198/173, 205, 50, 51, 66, 198/72, 73, 204, 207, 84, 85, 159, 206, 160

[56] References Cited
UNITED STATES PATENTS

| | | | |
|---|---|---|---|
| 1,235,406 | 7/1917 | Williams | 198/204 |
| 1,656,602 | 1/1928 | Ouellette | 198/206 |
| 3,092,116 | 6/1963 | Stroburg et al. | 198/204 |
| 3,178,011 | 4/1965 | Oshanyk | 198/207 |

*Primary Examiner*—Richard A. Schacher
*Assistant Examiner*—Joseph E. Valenza
*Attorney, Agent, or Firm*—Trask, Jenkins & Hanley

[57] ABSTRACT

A single-chain feed conveyor for silage and the like, having a series of flights on a central bottom chain, which normally discharges at its forward end, is modified to provide discharge at intermediate points. Silage is received from a silo in irregular amounts and conditions. Leveling means over the forward-conveying trough breaks up any large clumps of the silage, and distributes the material more evenly along the conveyor pockets. A pressure plate over the end portion of the conveyor presses any high-standing material into the pockets and holds the material in the pockets as the flights swing part way about the sprocket at the forward discharge end. A shroud at such discharge end has an open condition in which it permits normal forward-end discharge from beneath the pressure plate, and has a closed condition in which it forms a return bend channel to receive the conveyed material from beneath the pressure plate and guide it to the return trough containing the return stretch of the conveyor chain. The returning flights then convey the material along the return trough to an opening in any desired point therein. The return bend shroud is shaped with wide clearance from the conveyor flights at the top to permit freedom of movement of the pressure plate and permit the flights to free themselves of overlying material, and with close clearance at the bottom where the flights swing toward the return trough to pick up the material cleanly from the bottom of the shroud.

6 Claims, 7 Drawing Figures

FEED CONVEYOR WITH SELECTIVE DISCHARGE

BACKGROUND OF THE INVENTION

This application is a continuation-in-part of our prior copending application Ser. No. 207,201, filed Dec. 13, 1971, now U.S. Pat. 3,750,861.

Single chain conveyors are widely used to convey material such as silage or haylage from a silo or other storage container to feed bunks accessible to cattle or other stock. By "silage" is meant both the usual corn silage and also hay silage, sometimes called "haylage." Such material is composed of corn plants or hay or the like which has been chopped and then stored in a silo, where it compacts and may be frozen. It is commonly unloaded from a silo by unloading mechanism which cuts loose the top layer of the body of material in the silo and throws it through the silo door into the down chute where it falls to the hopper of the conveyor. While the silage is normally chopped to short lengths, say ½ inch, it nevertheless contains substantial quantities of longer lengths, up to 5 ot 6 inches, and it is normally wet and sticky. It thus tends to clump. The unloading process has a loosening and fluffing action, but the silage is nevertheless delivered to the conveyor in irregular amounts or rates and in varying condition, with much of it loose and fluffy but other parts sticky and stringy and in clumps. The conveyor consists of a series of flights carried by a single detachable-link chain along a forward conveying upper trough having a bottom rectangular portion and upper flank walls to retain piled-up material and clumps. The chain is trained about sprockets at opposite ends of the trough and returns from the forward discharge end of the conveyor to the rearward loading end in a return trough beneath the forward conveying trough. The chain is commonly driven from the discharge end, and may travel at relatively high speed, for example 300 feet per minute.

Prior to the invention of our copending application, it has not been feasible to discharge conveyed material from such a conveyor at any point other than its normal forward end, and this has limited its usefulness. The present invention permits discharge at almost any point along the length of the conveyor and greatly increases its usefulness.

SUMMARY OF THE INVENTION

In accordance with the present invention the forward normal-discharge end of the conveyor is provided with a shroud having an open position in which it permits normal forward end discharge and a closed position in which it forms a return-bend channel to guide the conveyed material from the forward-conveying trough to the return trough. The material is then conveyed rearward in the return trough by the return stretch of the conveyor chain and its flights, and may be discharged at any point along the return trough where a bottom discharge opening is provided. Opening and closing the return bend shroud may be done either by providing a movable door or gate in a fixed shroud or preferably by forming the shroud in its entirety as a movable element. The flights are so spaced that two consecutive flights never lie closer than 180° from each other as they travel about the sprocket at the discharge end of the conveyor and through the return bend channel.

In the apparatus of our prior copending application, the irregularly-fed silage is leveled along the forward-conveying trough of the conveyor, and the return bend shroud at the forward end of the conveyor has a special shape which permits it to handle the leveled material and guide it to the return trough. While this operates quite satisfactorily, we have now discovered that equivalent or better and smoother operation and greater capacity is obtained by providing a downward-biased pressure plate over the end portion of the forward conveying trough, which plate has a sloping entrance portion, an intermediate flat portion and an end portion which extends part way about the path of the conveyor flights as the travel in their reversing movement about the forward-end sprocket of the conveyor.

It is difficult to know and explain the action which occurs beneath the pressure plate and in the return-bend as the plate and shroud guide the material to and through its reversing path, but we believe the action is as follows.

The leveling apparatus along the length of the conveyor breaks up large lumps and levels and distributes excess material among the conveyor pockets so that such pockets do not contain large amounts of high-standing or excess material as they approach the pressure plate. However, since the material is being pushed by the flights along a stationary trough, it tends to accumulate and pile up at the rear of the conveyor pockets and immediately ahead of the flights so that even normal loads in the pockets stand above the top edges of the flights. In the absence of the pressure plate, when such high standing loads reach the reverse turn in the shroud, the rapid forward swinging movement of the flights, especially at their outer edges, in their arcuate movement about the sprocket causes the high standing material to be thrown outward beyond the edges of the flights. In our prior application, the special shape of the shroud permitted the flights to clear themselves of this outward-thrown material before the flights again picked up the conveyed material in the lower quadrant of the shroud.

In the normal operation of the apparatus of the present application, it is believed the pressure plate presses down the high-standing material substantially to the level of the flights as the flights approach the reversing path, and that this pressing is normally possible because the material in the pockets is sufficiently loose and fluffy to be compressed as needed in this action. The pressure plate holds the conveyed material in the pockets and prevents it from being thrown out as the flights travel to and part way around the sprockets, which causes the material to be turned and thrown downward as the flights accelerate through the first part of their arcuate reversing path. The material is thus more positively turned and guided downward to the bottom quadrant of the shroud. In such bottom, the flights are in substantial riding contact with the wall of the shroud and pick up the material cleanly to convey it into the return trough. With normal loading this gives a positive and smooth flow of the material about the reversing path, without allowing the material to be caught between the flights and the walls to jam the conveyor.

If excess material is present, so that the loads in the conveyor pockets do not compress as needed, the pressure plate can lift against its downward bias, and this permits the excess material to pass to the return bend, and there permits the flights to move past and clear themselves of the high-standing excess material in the upper part of the shroud, in a manner like what we believe occurs in apparatus of our prior application, and to be free of over-lying material as they pick up the material at the bottom of the shroud.

BRIEF DESCRIPTION OF THE DRAWINGS

The accompanying drawings illustrate the invention. In such drawings:

FIG. 5 is a longitudinal sectional view of the delivery end of the conveyor showing the pressure plate and the return-bend shroud and their relationship with the conveyor chain and flights;

FIG. 6 is a section taken on the line 6—6 of FIG. 5, with drive mechanism omitted; and FIG. 7 is a longitudinal section showing a modification of the return bend shroud.

DESCRIPTION OF THE SPECIFIC EMBODIMENT

Figure 1:
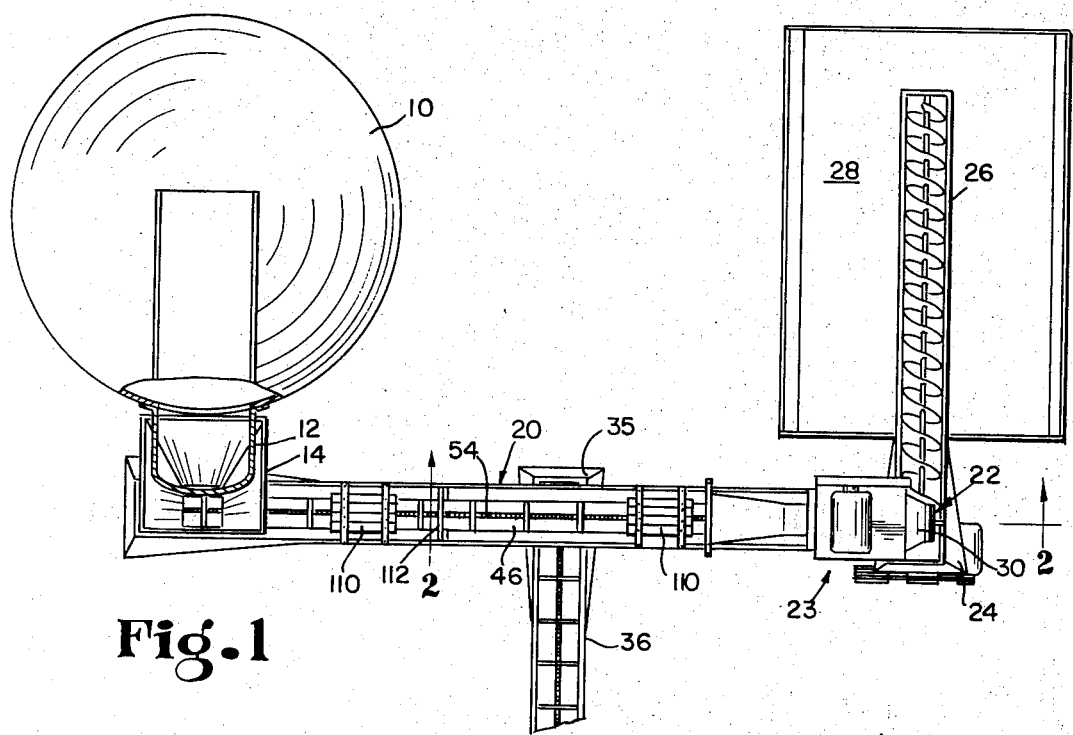
FIG. 1 is a somewhat diagrammatic plan view of a feed system employing a conveyor in accordance with the invention and having first and econd discharge points.
Figure 2:
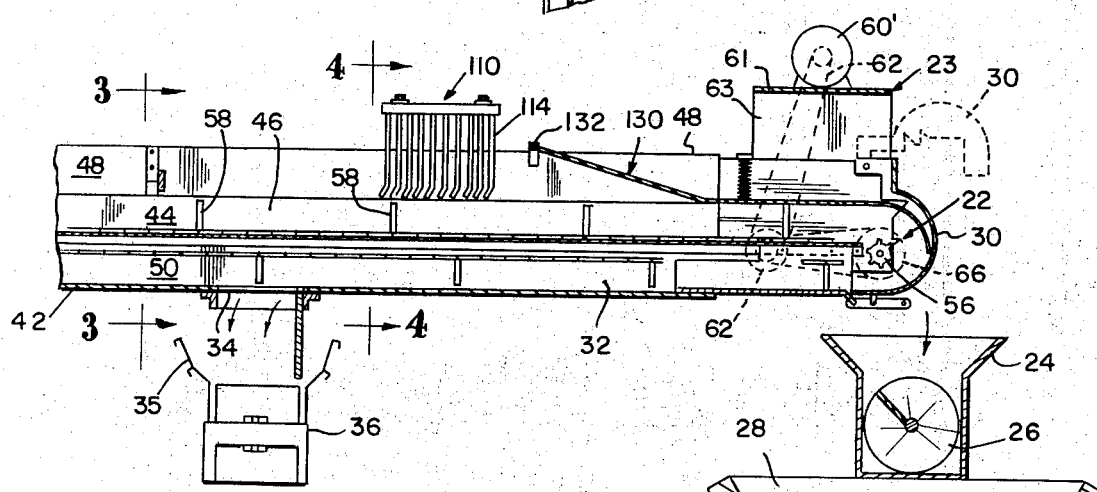
FIG. 2 is a vertical section on an enlarged scale taken on the line 2—2 of FIG. 1.

The feed distribution system shown in FIGS. 1 and 2 comprises a storage silo 10 from which silage is unloaded to a chute 12 through which it drops to a hopper 14 at the loading end of a single chain conveyor 20, which carries the silage forward, to the right in FIG. 1 in a forward trough 46. The forward end 22 of the conveyor trough is normally open so that the silage is discharged at that forward end into the receiver 24 of a screw conveyor 26 which delivers the silage to and distributes it along a feed bunk 28. In accordance with the present invention, the discharge end of the conveyor 20 is provided with a return-bend shroud 30 which, when open, allows the conveyor to discharge normally to the receiver 24.

Figures 5, 6, 7:
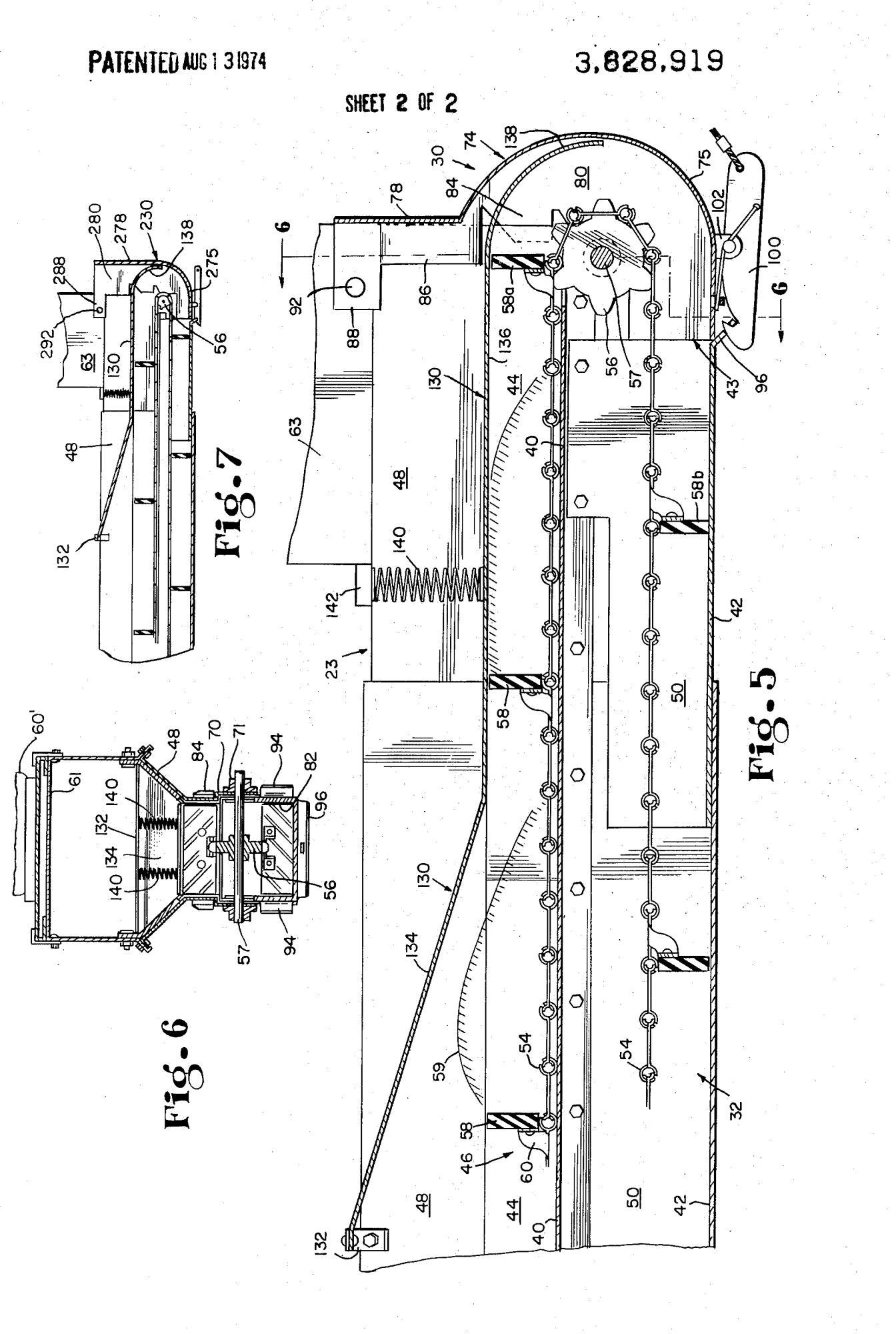

When the shroud 30 is closed against the discharge end 22 of the conveyor 20, as shown in full lines FIGS. 1, 2, and 5, it forms a return bend chute or channel through which the conveyed material is delivered to the return trough 32 of the conveyor, to be conveyed along that trough to a discharge opening 34, where it falls into the receiver 35 of a transverse second conveyor 36 for conveying it to a second feed bunk (not shown).

Figure 3:
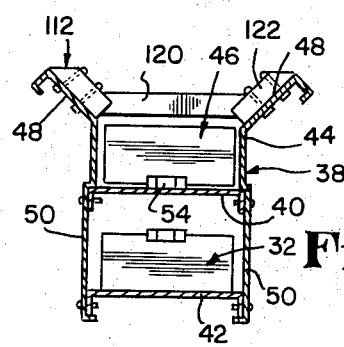
FIG. 3 is a section taken on the line 3—3 of FIG. 2 showing a primary leveling device.

The conveyor 20, as shown in FIG. 3, comprises a pair of formed side frame walls 38 joined and held in spaced relation by upper and lower decks 40 and 42. The side section walls 38 have portions forming straight vertical side walls 44 extending upward from the deck 40 to form the upper forward-conveying trough 46. The tops of the vertical walls 44 join outward sloping flank walls 48 for containing any excess material above the trough 46. The side sections 38 also include lower vertical walls 50 which are joined to the lower deck 42 to form the return trough 32.

A conveyor chain 54, desirably formed of detachable links, extends centrally along the deck 40 of the forward conveying trough 46, over a drive sprocket 56 at the discharge end of the conveyor, thence along a return stretch through the return trough 52 to an idler sprocket (not shown) at the loading end of the conveyor. The chain 54 carries a series of flights 58 in spaced relation so as to form conveyor pockets between the flights. For example, the flights 58 may be carried by brackets 60 on every eighth link of the chain to form conveyor spaces or pockets having a length several times their depth. In a preferred commercial conveyor shown in FIG. 5, the flights are fabric-reinforced rubber about ½ inch thick, about 6 inches wide and 2¼ inches deep, and are spaced 13½ inches, center to center, so that the pockets are 2¼ inches deep and a little over 12 inches long between flights. In the forward conveying trough 46, the chain is at the bottom of the flights 54 and rides along the deck 40. The flights are shaped to substantially slide on the deck 40 and have close clearance relation with the side wall sections 44. In the return trough, the flights are inverted, so that the chain 54 is at the top of the flights, and what were the tops of the flights are now the bottoms, and such bottom edges of the flights 58 ride on the lower deck 42. The conveyor spaces are thus downwardly unobstructed, and any conveyed material is retained therein solely by the bottom trough wall formed by the deck 42.

The conveyor is conventionally provided with an end section 23 which carries the drive and is longitudinally adjustable to tighten the chain. A drive motor 60' is mounted on a platform 61 carried by side walls 63 on the flank walls 48, and drive is by a belt 62 to a stepped pulley 64, thence by a belt to a drive pulley 66 fixed on the shaft 57 of the sprocket 56.

The end section, shown in FIGS. 2 and 5, has its bottom deck 42 and side walls 50 terminated at the point 43, well back from the sprocket 56 so that conveyed material will not normally be carried into the return trough. The deck 42 and walls 50 have outward bent flanges 94 and 96 at their edges to form entrance guides for the flights 58. The side frame walls 38 have side plates 70 which support bearings 71 for the sprocket shaft 57. The upper deck 40 extends substantially to the centerline of the shaft 57, level with the root of the sprocket 56, and is notched at the center to clear the sprocket. The side walls 44 and flange walls 48 of the upper trough 46 extend beyond the sprocket to contain and guide the conveyed material for discharge.

The conveyor 20 normally discharges at its forward end 22. For purposes of the present invention, this may be considered a first discharge point. To prevent discharge at this first discharge point, and to cause the conveyed material to travel further to a second discharge point, such as the discharge opening 34 in the return trough 32, the discharge end of the conveyor 20 is provided with a closeable shroud 30.

The return bend shroud 30 may be shaped as in our prior copending application, so as to receive the conveyed material from the forward-end of the upper trough 46 and to deliver it to the return trough 32 to be conveyed along that trough by the flights 58 of the conveyor in their return travel. At the forward end of the conveyor, the flights 58 swing about the sprocket 56 with their free edges traveling along a curved path 68 through 180°, and they change direction of travel from forward travel in the upper trough 46 to return travel in the lower trough 52. As shown in FIG. 5, the flights 58 are normally spaced so that not more than one flight is traveling about the sprocket 56 along the curved path 68 at any one time. When one flight 58a reaches the entrance to the shroud 30, immediately above the sprocket shaft 56, the next preceding flight 58b will be well into the return trough 32 to leave the bottom of the shroud open to receive the material in the pocket between those two flights.

The return bend shroud 30 shown comprises an outer wall 74 which has its lower edge received against the guide flange 96 and substantially aligned with the lower deck 42. From that deck 42, the wall extends in a horizontal section 76 to a point below the centerline of the sprocket 56, thence in a curved section 75 counterclockwise about the sprocket 56. In its lower quadrant, the curved section 75 is in close clearance or rubbing relation with the outer edges of the flights 58 as they travel along the curved path 68, and such close clearance desirably extends over a considerable arc, desirably of say 60° to 90° and preferably of about 70°, so that the close clearance is present over substantially the whole path of the flights as they sweep from horizontal to inverted position. The wall 75 then continues upward, through an upper quadrant, in progressively widening clearance from the flights, to the terminal edge of the flank walls 48, where it has a wide clearance from the top edges of the flights. There, it joins a vertical wall 78 which extends up to a point at or above the top of the flank walls 48. The curved wall 75 and its extensions 76 and 78 are joined at their edges to side walls 80 which close the sides of the shroud. Such side walls 80 have lower sections 82 received against and within entrance guide flanges 94 and substantially aligned with the side walls 50 of the return trough 52, and lying in close fitting relation with or inside the bottom and end edges of the side plates 70. Above the plates 70, the side walls 80 carry tongues 84 which are bent outward to overlap the outer faces of the side walls 44 of the upper trough 46. Above those side walls 44, the walls 80 of the shroud have extensions 86 which slope outward in position to overlap the inner faces of the flank walls 48. These are joined at their upper edges to rearward extending arms 88 which stand beside the side walls 63 of the motor platform 61 and are pivoted to such walls 63 by bolts 92. The shroud 30 will swing as a unit from closed position as shown in full lines to raised or open position as shown in dotted lines.

To retain the shroud 30 in closed position and its bottom edge in alignment with the lower deck 42, the lower section of the outer shroud wall carries a latch lever 100 pivoted in brackets 102 and spring-pressed to latched position. The entrance guide flange 96 is provided near its end with an opening to form a keeper slot for the nose of the latch lever 100. A rope tied to the opposite end of the latch lever 100 may be pulled to release the lever and raise the shroud 30 from closed to open position.

Figure 4:
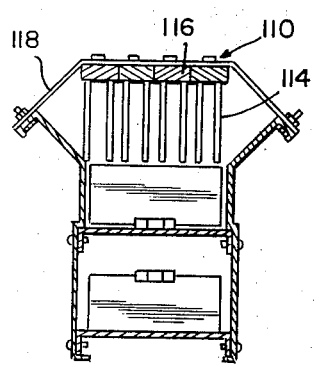
FIG. 4 is a section taken on the line 4—4 of FIG. 2 showing a secondary leveling device.

With at least some kinds of stock feed, especially the silage and haylage for which the invention is particularly useful, large clumps or masses tend to be present in the material fed to the conveyor, and the irregular feed may deposit piles of excess material on the conveyor. Such clumps or piles are broken up and redistributed along the conveyor, and the conveyed material is leveled during its forward travel along the conveyor. The leveling means shown comprises two tine levelers 110 mounted over the conveyor 20, one near its loading end and the other farther along the conveyor. A bar leveler 112 is mounted between the tine levelers. As shown in FIGS. 2 and 4, each tine leveler 110 consists of a multiplicity of flexible tines 114 fixed in blocks 116 supported above the conveyor trough 46 by arched brackets 118 mounted on the flank walls 48. As shown in FIG. 2, the lower ends of the tines 114 may be bent rearward of the direction of conveyor travel so as to catch clumps or piles of silage standing above the upper edge of the flights 58 and retain the same while a series of successive flights travels past the leveler tines to break up the clumps and distribute the material in successive conveyor pockets.

The bar leveler 112 comprises a cross bar 120 extending between mounting blocks 122 bolted to the flange walls 48. This forms a rigid barrier to stop any heavy clumps of material which pass the first tine leveler, and to co-act with the moving flights 58 to exert a shearing action on any such clumps to break them up and distribute them in the successive conveyor spaces.

A pressure plate 130 is mounted over the conveyor trough 46 at the forward or discharge end of the conveyor, beyond the second tine leveler 110. Such plate is fixed at its rear end to a cross bar 132 bolted to the flank walls 48 at their upper edges. The plate has a sloping first section 134 which slopes downward to a point in close proximity to the path of the top edges of the flights 58 and is there jointed to a flat second section 136. The sloping section is of decreasing width so that its side edges lie substantially in contact along their length with the sloping flank walls 48 of the conveyor. The flat second section may be, and is shown as, slightly wider than the conveyor trough 46 so that its edges rest on the lower portions of the flank walls 48 and it is supported by such flank walls in closely spaced proximity and parallel to the path of the top edges of the flights 58. The forward end of the flat section 136 is joined to a curved section 138 which extends through an arc of approximately 90° and lies along the path of the flights as they swing through the first or upper quadrant of their reversing movement about the sprocket 56. Its free end terminates in substantial contact with the outer wall 75 of the shroud 30 at a point where such shroud has clearance from the path of the flights 58 at least equal to the thickness of that free end. The flat section 136 is substantially longer than the spacing between the flights 58, so that it will fully cover at least one conveyor pocket as the pockets approach the return bend formed by the shroud 30 and the curved section 138 of the pressure plate. The sloping section 134 has a length sufficient to provide a gradual slope so as to press downward on conveyed material standing above the conveyor flights with little tendency to force such material rearward out of the conveyor pockets. With a conveyor having pockets 12 inches long it has been found desirable to make the flat section 136 about 18 inches long and to make the sloping section also 18 inches long and with a drop of about 3 inches over its length.

The pressure plate is pressed downward at a point intermediate its length by a pair of springs 140 mounted on and reacting against a reaction bar 142 extending across the conveyor and bolted to its flank walls 48. It is thus free to flex about its rear fixed end and to rise and float above the conveyor trough when excess material is present to raise it from its normal position. In such rising and floating movement, its free end will ride up along the curved upper portion of the shroud wall 75 where that wall has progressively increasing clearance from the flight path.

The modification shown in FIG. 7 is similar to that shown in FIG. 5 except for the shape and construction of the shroud 130. The outer wall 275 of such shroud, like that of the shroud 30, has a lower quadrant portion 275 curved in an arc about the axis of the sprocket 56 and extending through about 70°. The wall then curves outward to the 90° point and is there joined to a generally vertical end wall 278 which extends upward to a point above the flank walls 48. The end wall widens toward the top to match the sloping flank walls 48, and the sides of the shroud are closed by side walls 280 which connect at the top to rearward extending legs 288 by which the shroud is pivoted to the vertical walls 63 of the motor platform, as by bolts 292, in a manner similar to the mounting of the shroud in FIG. 5. This change of the shroud end wall from the curved configuration shown in FIG. 5 may be made in view of the presence of the pressure plate 130 with its downward-curved end section 138 for turning the conveyed material through the first quadrant of movement about the sprocket 56. The vertical end wall 278 lies beyond and clears the end of the pressure plate section 138, and opens the space above that curved section 138 to permit the pressure plate to flex upward about its rear fixed end and to float above its normal position when excess material is present in the conveyor pockets passing beneath it.

Operation is as follows: Silage is delivered from the silo 10 by conventional unloading mechanism into the chute 12, where it falls to the hopper 14 which feeds it to the loading end of the conveyor 20. The unloading rate may be quite irregular, and the silage may contain clumps, so that the conveyor may be fed at an irregular rate and in momentarily excessive amounts and in clumps which will stand above the conveyor trough 46 and be retained by the flank walls 48. As the material is conveyed along the conveyor, material are broken up, and the excess material standing above the trough 46 and the flights 58 will be leveled by the tine and bar levelers 110 and 112 and redistributed to the successive conveyor pockets traveling along the trough 46. Even with such leveling, the conveyed material may stand above the flights 58 as it approaches the forward end of the conveyor. One reason for this is that the conveyed material is being pushed along the stationary trough 46 by the moving flights 58, and tends to move to the rear of the conveyor pockets and to pile up in front of the flights in piles 59, such as that shown in FIG. 5, which stand above the flights 58, leaving little or no material immediately behind the flights 58.

The silage is commonly wet and stringy, but is also commonly loose and fluffy so that the piles 59 can be compressed by downward pressure. As the piles 59 are carried forward toward the end of the conveyor trough 46, they engage the sloping section 134 of the pressure plate 130, and this compresses them downward as they travel along that downward-sloping portion 134 and beneath the horizontal portion 136. The horizontal portion then confines the material in the pockets as the conveyed material approaches the sprocket 56. When the material reaches and passes around the sprocket 56, the curved portion 138 of the pressure plate 130 turns it downward. When the shroud 30 is closed, such downward turning occurs in the upper quadrant of the return bend of the shroud and the material is discharged to the bottom of the shroud 30, into its lower quadrant. There, the outer wall 74 follows the path of the flights 58 and normally has riding contact with the flights. Accordingly, in that lower quadrant, the flight at the rear of each conveyor pocket picks up the material ahead of it in the bottom of the shroud without having to separate such material from other adjacent material and without catching the material between the flight and the wall of the shroud. The flight thus picks the material up cleanly and carries it into the return trough 32, where it is conveyed rearward to the discharge opening 34.

When the shroud is open, as shown in dotted lines in FIG. 2, the pressure plate 130 acts in a similar manner to compress the piles 59 of material in the conveyor pockets and to turn the material downward through an upper quadrant of movement about the sprocket 56. The material is thus discharged downward at the forward end of the conveyor with more accuracy and less scatter than occurs in the absence of the pressure plate, and the material is delivered more certainly into the underlying hopper 24 of the screw conveyor 26. The pressure plate thus has an advantageous function both when the conveyor discharges from its normal forward end to the conveyor 26 and also when the shroud is closed and the material travels around the return bend and along the return conveyor trough 32 for discharge to the alternative conveyor 36.

If the conveyed material is present in the conveyor pocket in such excess amount or in such hard packed condition that it will not be compressed into the conveyor pockets below the tops of the flights 58, the pressure plate 130 is free to float upward to allow the material to pass to the end of the conveyor without jamming the conveyor operation. When the shroud is elevated, it presents no obstruction to such upward floating movement. When the shroud 30 is closed, the upper curved portion of its end wall 74 overlies the end of the pressure plate, but the pressure plate is flexible and simply bends toward contact with that end wall as it floats upward, and the reaction to such bending increases the downward bias on the plate.

The action of the flights as they change from horizontal movement along the trough 46 to swinging movement about the return bend in the shroud 30 causes the flights to be accelerated rapidly in the upper quadrant of their swinging movement. This tends to throw the conveyed material out of the pockets in the upper quadrant of return bend movement. In the shroud of our prior application, shaped as shown in FIG. 5, and in the absence of the pressure plate, the outward-thrown material was deflected downward by the overlying, wide-clearance, sloping wall of the shroud; but the accelerating outer edges of the flights would swing past some of such material so as to clear themselves of overlying material and to let such material drop in the space behind the flight, and such material would be transferred from one pocket to the next-following pocket. The same action can occur with the present structure when excess material is present to float the pressure plate upward and into conformity with the outer wall of the shroud 30, so as to permit the conveyor to handle excess material in substantially the same way as in our prior application. But the pressure plate normally prevents this outward throwing action and transfer of material backward along the conveyor pockets, by confining the material in the pockets and positively holding it in front of the flights even during their acceleration into their swinging movement about the sprocket.

In the modification of FIG. 7, the shroud end wall is shaped to allow the end of the pressure plate to float upwardly freely, without having to flex into conformity with an overlying curved wall. In this case, the curved end section 138 performs substantially the same function as in FIGS. 1-6. With normal conveyor loading, it turns the material downward about the sprocket as before; whereas with excess material, it floats upward, but still serves to deflect and turn the material downward, while permitting the flights to accelerate and throw off overlying material and drop it behind.

Whether or not these explanations account for all the improvement, we have found that the presence of the pressure plate 130 in a conveyor otherwise like that of our prior application substantially improves the smoothness of operation and the capacity of the conveyor both for forward discharge with the shroud 30 in elevated position as shown in dotted lines in FIG. 2, and for alternative discharge with the shroud 30 in closed position as shown in full lines in FIGS. 2 and 5 and with the conveyed material turned by the shroud into the return trough 32 and carried to the discharge opening 34 intermediate the length of the conveyor.

We claim:

1. A selective discharge conveyor for silage and the like, comprising
   walls forming a forward-conveying trough and a return trough,
   a sprocket or the like at the forward end of said troughs,
   a conveyor including a series of spaced flights connected to a chain or the like, forming conveyor pockets between the flights, and movable forward along the forward trough, then about said sprocket and into and rearward along the return trough, the chain in said return trough being supported above the bottom edges of the flights and the conveyor pockets between the flights being downwardly open,
   drive means for driving the conveyor in said forward and return movement,
   wherein the improvements comprises
      a shroud about the forward end of the troughs, having an open condition in which it provides an opening for discharge of conveyed material from the conveyor flights as the flights pass about the sprocket, and having a closed condition in which the shroud forms a channel for guiding conveyed material to the return trough to be conveyed therealong by return movement of the flights,
      a pressure plate overlying the forward-conveying trough along that portion thereof where the conveyor pockets approach the sprocket to confine conveyed material in the pockets, said plate having a downward-sloping first section to compress high-standing material into the conveyor, and having a downward curved later section extending about a major portion of the upper quadrant of flight movement about the sprocket to turn the conveyed material downward to the lower part of the shroud,
      said pressure plate being mounted to the conveyor structure in a manner permitting its forward portion to float upward to pass excess material, and means biasing such forward portion downward toward the path of said flights,
      said shroud having an upper portion in clearance relation with the downward curved section of the pressure plate to permit the same to float upward, and having a lower arcuate outer wall portion in close clearance relation with the outer edges of the flights over a major portion of their lower quadrant of movement about the sprocket, and means forming an opening in the bottom of the return trough through which conveyed material will drop from the downwardly open conveyor spaces.

2. A conveyor as in claim 1 in which the pressure plate has a flat second section for confining the compressed material and leading to said curved section.

3. A conveyor as in claim 1 with the addition of means located along the forward-conveying trough for leveling the conveyed material before it reaches the pressure plate.

4. A selective discharge conveyor for silage and the like, comprising
   walls forming upper and lower troughs,
   sprockets or the like at the opposite ends of said troughs,
   a conveyor including an endless series of spaced flights connected to a chain or the like and extending along the upper trough, about said sprockets and along the return trough, the chain in said return trough being supported above the bottom edges of the flights and the conveyor spaces between the flights being downwardly open,
   drive means for driving the conveyor toward one end in the upper trough and toward the other end in the lower trough,
   a shroud about said one end of the troughs for forming a return bend channel for guiding conveyed material from the upper trough to the bottom trough to be conveyed therealong by movement of the flights toward said other end, said shroud having an outer wall in wide clearance relation with the top edges of the flights as the flights begin their sweep through the bend and in close clearance relation therewith as the flights sweep through the bottom part of the bend, so as to cause the flights to pick up silage and the like in the bottom part of the shroud without catching such material between the flights and said wall,
   wherein the improvement comprises
      a pressure plate overlying the upper trough along that portion thereof where the conveyor flights approach the shroud at said one end thereof,
      said pressure plate having a downward sloping first section to compress high standing material into the conveyor spaces, a second section for confining the material therein and extending to the shroud and a third section joined to the forward end of the second section and extending in an arc about the path of the conveyor flights in underlapping relation with a substantial portion of shroud outer wall where such wall has wide clearance relation with the flights,
      said forward section being yieldingly biased downward toward the upper trough so as to normally confine substantially within the conveyor spaces between the flights the material conveyed to the shroud, but to float upward as needed to pass limited amounts of excess material to the wide-clearance portion of the shroud.

5. A selective discharge conveyor for silage and the like, comprising walls forming a forward-conveying trough and a return trough, a sprocket or the like at the forward end of said troughs, a conveyor including a series of spaced flights connected to a chain or the like, forming conveyor pockets between the flights, and movable forward along the forward trough, then about said sprocket and into and rearward along the return trough, the chain in said return trough being supported above the bottom edges of the flights and the conveyor pockets between the flights being downwardly open, drive means for driving the conveyor in said forward and return movement, wherein the improvement comprises a shroud about the forward end of the troughs, having an open condition in which it provides an opening for discharge of conveyed material from the conveyor flights as the flights pass about the sprocket, and having a closed condition in which the shroud forms a channel for guiding conveyed material to the return trough to be conveyed therealong by return movement of the flights, a pressure plate overlying the forward-conveying trough along that portion thereof where the conveyor pockets approach the sprocket to confine conveyed material in the pockets, said plate having a downward-sloping first section over the conveyor to compress high-standing material into the conveyor pockets, a flat second section for confining the compressed material, and a downward curved section joined to said second section and extending about a major portion of the upper quadrant of flight movement about the sprocket to turn the conveyed material downward to the lower part of the shroud, said shroud having a lower arcuate outer wall portion in close clearance relation with the outer edges of the flights over a major portion of their lower quadrant of movement about the sprocket, and means forming an opening in the bottom of the return trough through which conveyed material will drop from the downwardly open conveyor spaces, said shroud having an end wall curved about the path of the conveyor flights, overlying said downward curved section of the pressure plate and in progressively decreasing spacing from the path of the flights as they move from vertical to horizontal position.

6. A conveyor as in claim 5 with the addition of means located along the forward-conveying trough for leveling the conveyed material before it reaches the pressure plate.

* * * * *

UNITED STATES PATENT OFFICE
CERTIFICATE OF CORRECTION

Patent No. 3,828,919                    Dated August 13, 1974

Inventor(s)  Robert G. Holtsclaw

It is certified that error appears in the above-identified patent and that said Letters Patent are hereby corrected as shown below:

Column 3, line 12, change "econd" to --second--.

Column 7, line 39, after "conveyor", add --from left to right in Figs. 1 and 2, any such clumps of--.

Signed and sealed this 24th day of December 1974.

(SEAL)
Attest:

McCOY M. GIBSON JR.              C. MARSHALL DANN
Attesting Officer                Commissioner of Patents